United States Patent [19]
Oh

[11] Patent Number: 5,715,112
[45] Date of Patent: Feb. 3, 1998

[54] APPARATUS FOR ADJUSTING A GAP BETWEEN TRANSFORMERS IN A TAPE RECORDER

[75] Inventor: Se-Woog Oh, Seoul, Rep. of Korea

[73] Assignee: Daewoo Electronics Co., Ltd., Seoul, Rep. of Korea

[21] Appl. No.: 511,217

[22] Filed: Aug. 4, 1995

[30] Foreign Application Priority Data

Nov. 21, 1994 [KR] Rep. of Korea ............... 94-30750

[51] Int. Cl.$^6$ .................................................. G11B 5/48
[52] U.S. Cl. .................................................. 360/84
[58] Field of Search ............................ 360/84, 107, 109

[56] References Cited

U.S. PATENT DOCUMENTS 4,603,359  7/1986  Narasawa et al. ................ 360/107

FOREIGN PATENT DOCUMENTS 3-178023  8/1991  Japan .
6-139505  5/1994  Japan .
396707    3/1974  U.S.S.R. ............................ 360/107

*Primary Examiner*—Stuart S. Levy
*Assistant Examiner*—George J. Letscher
*Attorney, Agent, or Firm*—Pennie and Edmonds, LLP

[57] ABSTRACT

The head drum assembly for use in a tape recorder comprises a rotating shaft divided arbitrarily into an upper and a lower parts, a rotary drum pressed in and fixed to the upper part of the rotating shaft, the rotary drum having a protruding cylindrical portion with its center coinciding with that of the rotating shaft, a stationary drum attached at the lower part of the rotating shaft through a plurality of bearings, the stationary drum being hollowed out thereby being provided with an inside bottom surface, the stationary drum further including a bottom surfaces, a rotary transformer bonded to the protruding cylindrical portion, a stationary transformer fixed to and installed on inside bottom surface of the stationary drum, the rotary transformer and the stationary transformer being aligned and separated by a gap, and a transferrer for adjusting the gap between the rotary transformer and the stationary transformer. The transferrer includes a set screw and a feed ring with a matching tapped hole and is located at the bottom surface of the stationary drum and the top of the set screw is in a physical contact with the bottom of the rotating shaft in such a way that the rotary drum is moved vertically by turning the set screw, thereby allowing the gap between the rotary transformer and the stationary transformer to be adjusted.

1 Claim, 2 Drawing Sheets

APPARATUS FOR ADJUSTING A GAP BETWEEN TRANSFORMERS IN A TAPE RECORDER

FIELD OF THE INVENTION

The present invention relates to a head drum assembly for use in a tape recorder; and, more particularly, to an improved head drum assembly capable of adjusting and maintaining precisely a predetermined gap between a rotary transformer and a stationary transformer therein.

DESCRIPTION OF THE PRIOR ART

As is shown in FIG. 1, a conventional head drum assembly 100 for use in a tape recorder normally comprises a rotating shaft 1 divided arbitrarily into an upper part 101 and a lower part 102, a rotary drum 2, a flange 3, a stationary drum 4, a plurality of bearings 5, a rotary transformer 6 and a stationary transformer 7.

The rotary drum 2 is joined to the upper part 101 of the rotating shaft 1 via the flange 3; and the stationary drum 4 is attached to the lower part 102 of the rotating shaft 1 through the plurality of bearings 5.

The rotary transformer 6 may be attached at the bottom of the flange 3 using, e.g., a bonding agent. The stationary transformer 7 for producing a predetermined electric signal may be fixedly installed inside the stationary drum 4 using, e.g. a bonding agent, at a predetermined distance from the rotary transformer 6.

In addition, the rotary transformer 6 is electrically connected to a video head(not shown), and the stationary transformer 7 is electrically connected to a primary amplifier (not shown) through an outside lead line(not shown).

In such a head drum assembly, it is particularly desirable to keep the gap between the rotary transformer, 6 and the stationary transformer 7 as small as possible and maintain the gap constant during the operation thereof. For the smaller this gap is, the easier the signal from the rotary transformer 6 is transmitted to the stationary transformer 7.

In the conventional head drum assembly, the gap between the rotary transformer 6 and the stationary transformer 7 is permanently set during the process of putting the rotary drum 2 and the stationary drum 4 together by inserting a spacer(not shown) between the rotary drum 2 and the bearings or by machining the rotary drum and the stationary drum surfaces. Both of these processes, however, in addition to being very cumbersome, introduce additional steps in the assembling of the head drum, resulting in a decreased production efficiency.

SUMMARY OF THE INVENTION

It is, therefore, a primary object of the invention to provide a head drum assembly with a capability to adjust easily and maintain precisely the gap between a rotary transformer and a stationary transformer therein.

In accordance with one aspect of the present invention, there is provided a head drum assembly for use in a tape recorder comprising a rotating shaft divided arbitrarily into an upper and a lower parts, a rotary drum pressed on and fixed to the upper part of the rotating shaft, the rotary drum being hollowed out to thereby be provided with an inside bottom surface, the rotary drum further having an outside bottom surface for attaching a video head thereto and a protruding cylindrical portion with its center coinciding with that of the rotating shaft, a stationary drum attached at the lower part of the rotating shaft through a plurality of bearings, the stationary drum being hollowed out to have an inside bottom surface, the stationary drum further including an outside bottom surface, a rotary transformer bonded to the protruding cylindrical portion, a stationary transformer fixedly installed on the inside bottom surface of the stationary drum, the rotary transformer and the stationary transformer being aligned but separated by a gap, a transferrer for adjusting the gap between the rotary transformer and the stationary transformer, wherein the transferrer includes a set screw and a feed ring with a matching tapped hole and is attached to the outside bottom surface of the stationary drum at its center and the top of the set screw is in physical contact with the bottom of the rotating shaft in such a way that the rotary drum is moved vertically by turning the set screw, thereby rendering the gap between the rotary transformer and the stationary transformer adjustable.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
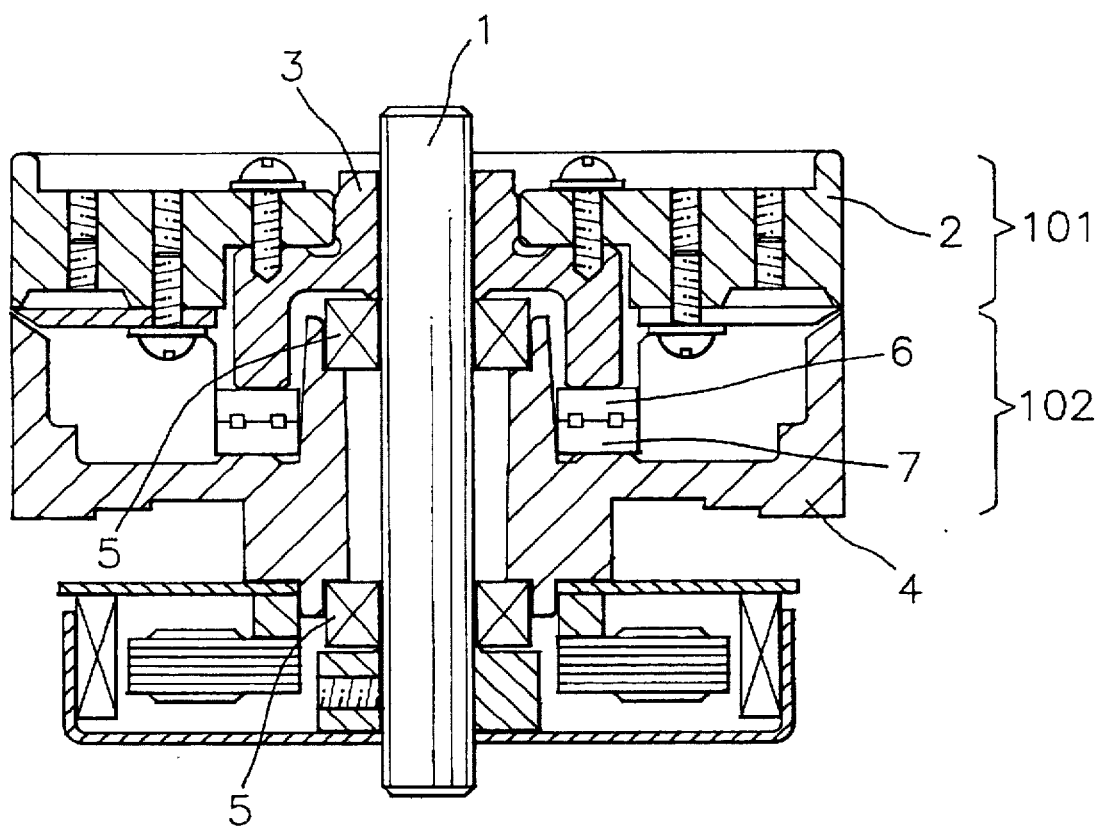
FIG. 1 shows a cross sectional view of the conventional head drum assembly.
Figure 2:
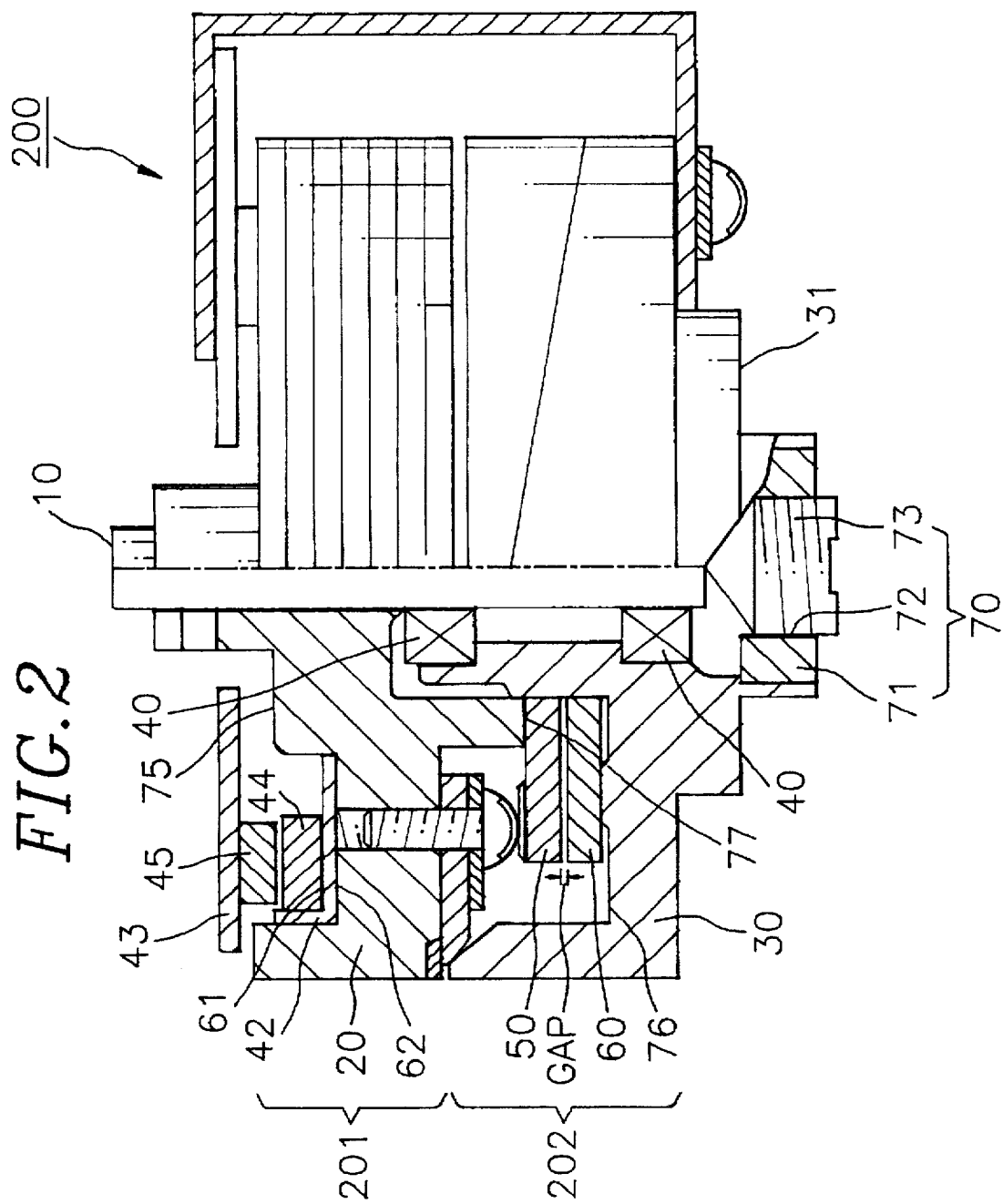
FIG. 2 represents a cross sectional view of the head drum assembly in accordance with the present invention.

There is shown in FIG. 2 an inventive head drum assembly 200 for use in a tape recorder, comprising a rotating shaft 10 divided arbitrarily into an upper part 201 and a lower part 202, a rotary drum 20 having a protruding cylindrical portion 77 with its center coinciding with that of the rotating shaft 10, a stationary drum 30 with an outside bottom surface 31, a plurality of bearings 40, a drum motor rotor 42 having a top and a bottom surfaces 61, 62, a drum motor stator 43, first and second permanent magnets 44, 45, a rotary transformer 50, a stationary transformer 60, and a transferrer 70 including a feed ring 71 with a tapped hole 72 and a matching set screw 73.

The rotary drum 20 is pressed on and fixed to the upper part 201 of the rotary shaft 10 and the stationary drum 30 is attached at the lower part 202 of the rotating shaft 10 through the plurality of bearings 40. The rotary drum 20 and the stationary drum 30 are hollowed out, thereby being provided with an inside bottom surface 75, 76, respectively. The drum motor rotor 42 is attached on the inside bottom surface 75 of the rotary drum 20.

The rotary transformer 50 is bonded to the protruding cylindrical portion 77 of the rotary drum 20 using, e.g., a bonding agent. The stationary transformer 60 for producing a predetermined electrical signal is aligned with the rotary transformer 50 and is installed on the inside bottom surface 76 of the stationary drum 30 using, e.g., a bonding agent, at a predetermined distance from the rotary transformer.

In addition, the rotary transformer 50 is electrically connected to a video head(not shown), and the stationary transformer 60 is electrically connected to a primary amplifier(not shown) through an outside lead line(not shown).

The transferrer 70 having the feed ring 71, the tapped hole 72 and the matching set screw 73 is attached to the outside bottom surface 31 of the stationary drum 30 at its center. And, the top of the set screw 73 is in a physical contact with the bottom of the rotating shaft 10.

In the novel head drum assembly 200, the rotating shaft 10 is installed in such a way that it can move vertically by using the transferrer 70 to thereby allow the rotary drum 20 fixed thereto, and hence the rotary transformer 50 attached to the protruding cylindrical portion 77 of the rotary drum 20 to move up and down.

In accordance with the present invention, the rotating shaft 10, and hence the rotary drum 20 fixed thereto, is moved up and down by turning the set screw 73, thereby rendering the gap between the rotary transformer 50 and the stationary transformer 60 adjustable.

However, in the inventive head drum assembly 200, the inside bottom surface 75 of the rotary drum 20 is provided with a driving magnet(not shown) and the drum motor rotor 42 with the first permanent magnet 44 being located on the top surface 61 of the drum motor rotor 42. Furthermore, the drum motor stator 43 includes a driving core(not shown) and the second permanent magnet 45, wherein the second permanent magnet 45 is attached thereto in such a way that it is located above the first permanent magnet 44 with the same poles from each of the permanent magnets 44, 45 facing each other, resulting in a repulsive force therebetween. The repulsive force sets a limit to the distance the rotary drum 20 is allowed to move upward by using the transferrer 70.

In addition, in assembling of the present head drum assembly 200, there is no need to insert the spacer or machine the drum surfaces, thereby increasing the production efficiency thereof.

Although the invention has been shown and described with respect to the preferred embodiments, it will be understood by those skilled in the art that various changes and modifications may be made without departing from the spirit and scope of the invention as defined in the following claims.

What is claimed is:

1. An apparatus for adjusting a gap between transformers in a tape recorder comprising:

a rotating shaft;

a rotary drum pressed on and fixed to the rotating shaft;

a stationary drum attached to the rotating shaft through bearing means;

a rotary transformer bonded to the rotary drum;

a stationary transformer installed on the stationary drum so as to face and to be aligned with the rotary drum but separated by a gap;

means for adjusting the gap between the rotary transformer and the stationary transformer, wherein the adjustment means includes a set screw and a feed ring having a matching tapped hole engaged with the set screw and is attached to the outside bottom surface of the stationary drum at its center, and the top of the set screw is in a physical contact with the bottom of the rotating shaft in such a way that the rotary drum is moved vertically by turning the set screw, and means for limiting the upward distance the rotary drum is allowed to move;

wherein said means for limiting comprises a first permanent magnet attached to the rotary drum and a second permanent magnet attached to a drum motor stator, the first and the second magnets facing each other and creating a repulsive force therebetween.

* * * * *